(12) United States Patent
Pancharathi

(10) Patent No.: US 10,339,199 B2
(45) Date of Patent: Jul. 2, 2019

(54) METHODS, SYSTEMS, AND COMPUTER READABLE MEDIA FOR CAPTURING AND STORING A WEB PAGE SCREENSHOT

(71) Applicant: Oracle International Corporation, Redwood Shores, CA (US)

(72) Inventor: Kranti Swarup Pancharathi, Morrisville, NC (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 95 days.

(21) Appl. No.: 14/683,802

(22) Filed: Apr. 10, 2015

(65) Prior Publication Data
US 2016/0299988 A1    Oct. 13, 2016

(51) Int. Cl.
G06F 17/22    (2006.01)
G06F 16/958   (2019.01)
G06F 17/21    (2006.01)
G06F 16/957   (2019.01)

(52) U.S. Cl.
CPC .......... *G06F 16/986* (2019.01); *G06F 16/957* (2019.01); *G06F 17/218* (2013.01); *G06F 17/2205* (2013.01); *G06F 17/2247* (2013.01); *G06F 17/2264* (2013.01)

(58) Field of Classification Search
CPC ........... G06F 17/30896; G06F 17/2247; G06F 17/30067; G06F 17/0601; G06F 17/30073; G06F 17/30; G06F 17/30005; G06F 17/30179; G06F 17/30569; G06F 2209/541; G06F 2212/465; G06F 11/3034; G06F 11/1446; G06F 17/218; G06F 17/22; G06F 17/2264; G06F 17/2205; G05B 2219/31288; H04N 5/23222; H04N 2201/3212
USPC ....................................................... 715/234
See application file for complete search history.

(56) References Cited

U.S. PATENT DOCUMENTS

| | | | | |
|---|---|---|---|---|
| 6,122,657 | A * | 9/2000 | Hoffman, Jr. ..... | G06F 17/30899 707/E17.119 |
| 6,718,015 | B1 * | 4/2004 | Berstis .................... | G10L 13/00 379/88.13 |
| 6,886,013 | B1 * | 4/2005 | Beranek ................. | H04N 21/40 348/E5.002 |

(Continued)

OTHER PUBLICATIONS

Author: NovaPDF, "Convert a web page to PDF", published Jan. 27, 2015, located at http://www.novapdf.com/kb/convert-a-web-page-to-pdf-100.html.*

(Continued)

*Primary Examiner* — Wilson W Tsui
(74) *Attorney, Agent, or Firm* — Jenkins, Wilson, Taylor & Hunt, P.A.

(57) ABSTRACT

Methods, systems, and computer readable media for capturing and storing a web page screenshot are disclosed. In some aspects, a method for capturing and storing a web page screenshot occurs at a server and includes sending web page file contents to a client for displaying a web page and receiving a request to capture and store at least some of the web page file contents. The method further includes capturing at least some of the web page file contents, converting the captured web page file contents into a document that resembles the displayed web page, and storing the PDF in a storage device associated with the server.

16 Claims, 4 Drawing Sheets

(56) References Cited

U.S. PATENT DOCUMENTS

| | | | | |
|---|---|---|---|---|
| 7,216,297 | B1* | 5/2007 | Douglis | G06F 9/4443 715/760 |
| 7,496,835 | B1* | 2/2009 | Chen | G06F 17/211 715/234 |
| 7,702,678 | B2* | 4/2010 | Teague | G06F 17/30884 707/722 |
| 8,326,922 | B2* | 12/2012 | Kern | H04L 29/06 709/203 |
| 8,365,082 | B2* | 1/2013 | Skirpa | G06F 17/2247 715/760 |
| 8,745,488 | B1* | 6/2014 | Wong | G06F 17/24 715/221 |
| 8,762,881 | B2* | 6/2014 | Lawrance | G06F 11/3688 715/781 |
| 8,812,946 | B1* | 8/2014 | Kopylov | G06F 17/2247 715/202 |
| 9,251,228 | B1* | 2/2016 | Iyer | G06F 17/30572 |
| 9,794,364 | B2* | 10/2017 | Shkolnikov | H04L 67/2823 |
| 2007/0204223 | A1* | 8/2007 | Bartels | H04N 21/4532 715/210 |
| 2008/0201452 | A1* | 8/2008 | Athas | H04L 29/12594 709/219 |
| 2009/0249194 | A1* | 10/2009 | Day | G06F 17/30896 715/239 |
| 2009/0287988 | A1* | 11/2009 | Cohen | G06F 9/543 715/204 |
| 2010/0214614 | A1* | 8/2010 | Ferlitsch | G06K 15/02 358/1.18 |
| 2011/0066662 | A1* | 3/2011 | Davis | G06F 17/2745 707/811 |
| 2012/0010995 | A1* | 1/2012 | Skirpa | G06F 3/0481 705/14.49 |
| 2012/0047203 | A1* | 2/2012 | Brown | G06Q 30/02 709/203 |
| 2012/0268795 | A1* | 10/2012 | O'Brien-Strain | G06F 17/211 358/1.18 |
| 2013/0254855 | A1* | 9/2013 | Walters | G06F 21/60 726/5 |
| 2014/0157104 | A1* | 6/2014 | Carlsen | G06F 17/227 715/234 |
| 2014/0310613 | A1* | 10/2014 | Megiddo | H04L 65/403 715/753 |
| 2015/0046779 | A1* | 2/2015 | Akselrod | G06F 17/241 715/202 |
| 2015/0067476 | A1* | 3/2015 | Song | G06F 17/2247 715/234 |
| 2015/0095757 | A1* | 4/2015 | Kamata | G06F 17/3092 715/234 |
| 2015/0254713 | A1* | 9/2015 | Brewer | G06Q 30/0256 705/14.54 |
| 2015/0310126 | A1* | 10/2015 | Steiner | G06F 17/2247 715/204 |
| 2016/0267060 | A1* | 9/2016 | Skirpa | G06F 3/0481 |

OTHER PUBLICATIONS

Author: TechSmith, "File Formats Overview", captured as published Feb. 16, 2014, obtained via Internet Archive Wayback Machine located at https://web.archive.org/web/20140216223625/http://www.techsmith.com/tutorial-snagit-file-formats-overview.html.*

Author: Mozilla, "Introduction—What is the DOM?", captured as published Jul. 27, 2014, obtained via Internet Archive Wayback Machine located at https://web.archive.org/web/20140727161220/https://developer.mozilla.org/en-US/docs/Web/API/Document_Object_Model/Introduction.*

Author: Microsoft, "Local Users and Groups overview", published Mar. 1, 2012, located at https://technet.microsoft.com/en-us/library/cc770756(v=ws.11).aspx.*

Mahmoud, "Servlets and JSP Pages Best Practices", published Mar. 2003, located at http://www.oracle.com/technetwork/articles/java/servlets-jsp-140445.html.*

NovaPDF, "Convert a web page to PDF", published Jan. 27, 2015, located at http://www.novapdf.com/kb/convert-a-web-page-to-pdf-100.html.*

TechSmith, "File Formats Overview", captured as published Feb. 16, 2014, obtained via Internet Archive Wayback Machine located at https://web.archive.org/web/20140216223625/http://www.techsmith.com/tutorial-snagit-file-formats-overview.html.*

Mozilla, "Introduction—What is the DOM?", captured as published Jul. 27, 2014, obtained via Internet Archive Wayback Machine located at https://web.archive.org/web/20140727161220/https://developermozilla.org/en-US/docs/Web/API/Document_Object_Model/Introduction.*

Microsoft, "Local Users and Groups overview", published Mar. 1, 2012, located at https://technet.microsoft.com/en-us/library/cc770756(v=ws.11).aspx.*

"JavaServerPages", published: Feb. 25, 2005, publisher: wikipedia, pp. 1-8 (Year: 2005).*

"Dump request and response using javax.servlet.Filter," Programming and So—Tips and tricks in Java, eGovernment, Electronic Signature, and Alfresco blog, https://angelborroy.wordpress.com/2009/03/04/dump-request-and-response-using-javaxservletfilter/, pp. 1-6 (Mar. 2009).

"The Essentials of Filters," Oracle Technoloy Network—Java, http://www.oracle.com/technetwork/java/filters-137243.html, pp. 1-7 (retrieved Apr. 10, 2015).

"ITEXT in Action: Chapter 9: Integrating ITEXT in your Web Applications," ITEXT Programmable PDF Software, http://itextpdf.com/examples/iia.php?id=56, pp. 1-5 (retrieved Apr. 10, 2015).

* cited by examiner

METHODS, SYSTEMS, AND COMPUTER READABLE MEDIA FOR CAPTURING AND STORING A WEB PAGE SCREENSHOT

TECHNICAL FIELD

The subject matter described herein relates to capturing and storing web page content. More specifically, the subject matter relates to methods, systems, and computer readable media for capturing and storing a web page screenshot.

BACKGROUND

Web pages or web screens typically contain both static and dynamic content such as tables, text, pictures, photographs, links, buttons, graphics, etc. Over time, the content may vary, change, become replaced, and/or updated. A challenge exists in capturing a screenshot of a web page as it appeared to a specific viewer on a specific day, and store the screenshot as a portable document on the server for later use. This is useful for users wanting to save a web page screenshot for use as an audit record, objective evidence, a research artifact, social media, or any other type of dated record. This is also useful for users wanting to save a web page screenshot for retrieval by others (e.g., a specific group), and not just by one individual. Furthermore, is challenging to capture a web page with selective content while still preserving the overall what-you-see-is-what-you-get layout.

Conventional methods of capturing and storing web page screenshots are performed on the client-side of an Internet connection, and involve a user having to constantly scroll down in order to take several images and obtain all of the content displayed on the web page. In other methods, pictures and attachments may be stored on a server's or client's file system using existing software, however, the original web page layout cannot be reconstructed using these individual elements.

Accordingly, a need exists for methods, systems, and computer readable media for capturing and storing a web page screenshot, directly on a server.

SUMMARY

Methods, systems, and computer readable media for capturing and storing a web page screenshot are disclosed. According to one exemplary method executed by a server, the method includes sending web page file contents to a client for displaying a web page and receiving a request to capture and store at least some of the web page file contents. The method further includes capturing at least some of the web page file contents, converting the captured web page file contents into a document having a portable format that resembles the displayed web page, and storing the document in a storage device associated with the server.

According to one exemplary system, a server is configured to send web page file contents to a client, receive a request to capture and store at least some of the web page file content, capture at least some of the web page file contents, and convert the captured web page file contents into a document. The system further includes a storage device associated with the server for storing the document for later retrieval.

The subject matter described herein may be implemented in software in combination with hardware and/or firmware. For example, the subject matter described herein may be implemented in software executed by a processor. In one exemplary implementation, the subject matter described herein may be implemented using a non-transitory computer readable medium having stored thereon computer executable instructions that when executed by the processor of a computer control the computer to perform steps.

Exemplary computer readable media suitable for implementing the subject matter described herein include non-transitory devices, such as disk memory devices, chip memory devices, programmable logic devices, field-programmable gate arrays (FPGAs), and/or application specific integrated circuits (ASICs). In addition, a computer readable medium that implements the subject matter described herein may be located on a single device or computing platform or may be distributed across multiple devices or computing platforms.

As used herein, the term "server" refers to a physical computing platform including one or more processors, network interfaces, and memory.

As used herein, each of the terms "function" and "module" refer to hardware, firmware, or software in combination with hardware and/or firmware for implementing features described herein.

BRIEF DESCRIPTION OF THE DRAWINGS

The subject matter described herein will now be explained with reference to the accompanying drawings of which.

DETAILED DESCRIPTION

In some embodiments, servers (public or private) are configured to provide data and/or services to users via communications between the server and one or more client devices. As used herein, the terms "client" or "client device" refer to a user and/or a device that is requesting data or services, while the term "server" refers to the provider of the data or service.

In some embodiments, the server is configured to host a plurality of web pages, and may be triggered or requested to capture and store a web page screenshot as described herein. The server may also be configured to suppress some of the content appearing on the web page via processing embedded content suppression tags within the HyperText Markup Language (HTML) or XML of the web page, where desired. The portable document (e.g., or a document having a portable format) may be retrieved by the client that initiated the capture and storage thereof, or the portable document may be retrieved by any number of clients or users. In some embodiments, the portable document may be retrieved by a designated or defined group.

As used herein, the term "browser" refers to a computer program for browsing the World Wide Web (WWW). As used herein, the term "web page" refers to a resource on the WWW. Notably, the captured web page file contents may be captured in HTML and converted into a document having a portable format that resembles the web page that is displayed to a user interfacing with the client.

Figure 1:
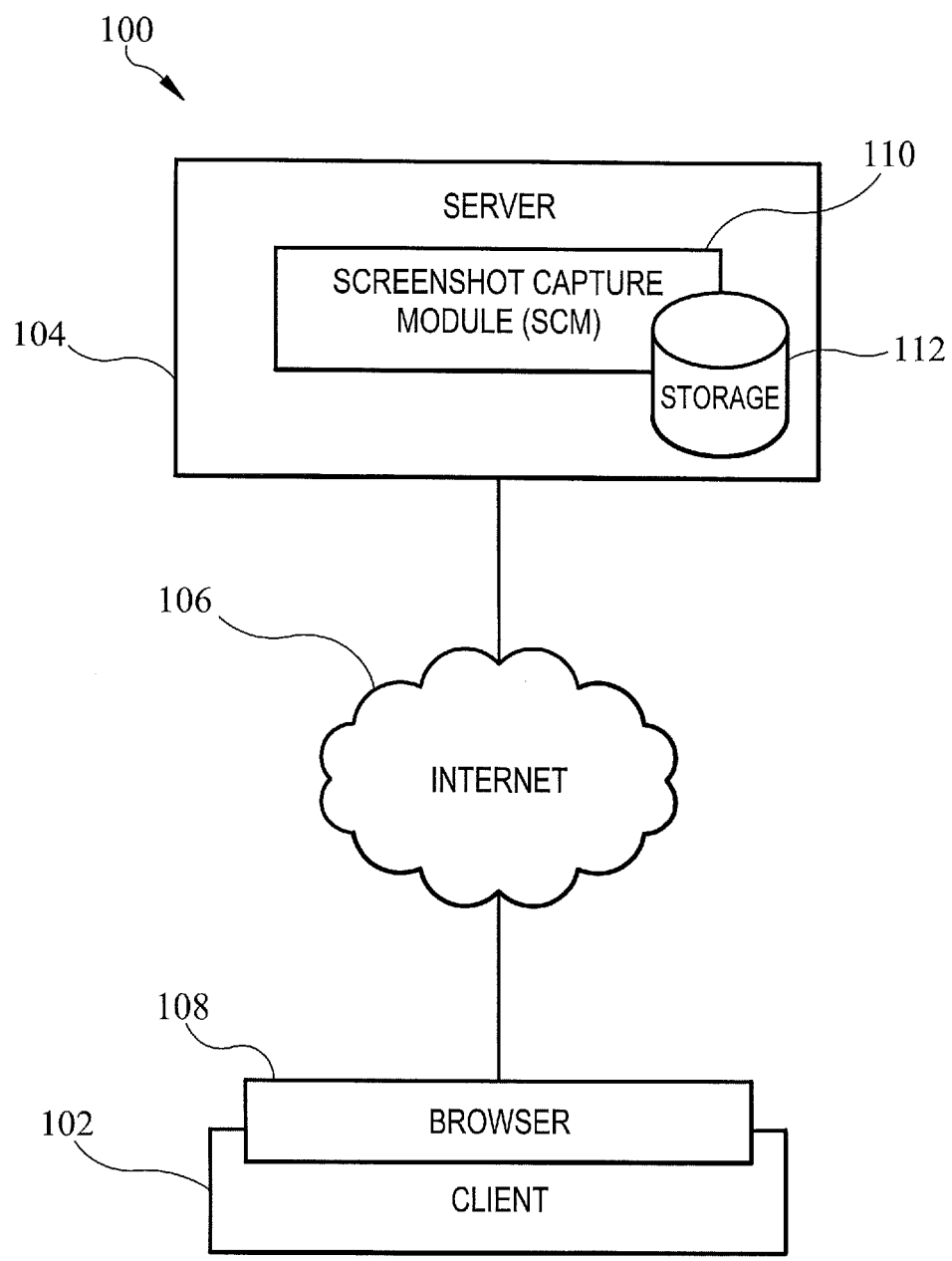
FIG. 1 is a schematic block diagram for a system for capturing and storing a web page screenshot according to an embodiment of the subject matter described herein.

FIG. 1 is a schematic block diagram of a system generally designated 100 for capturing and storing a web page screenshot as a document according to an embodiment of the subject matter described herein. The captured screenshot may be captured and stored as a document having a portable document format (PDF) on the server-side of an Internet connection. System 100 includes at least one client 102 and a server 104. Client 102 and server 104 are configured to communicate across a network connection and/or via the Internet 106. A user may interface with client 102 to access data, for example, from a web page hosted on server 104 via a browser 108. In some embodiments, a plurality of users may interface with a plurality of clients 102 to access data hosted by server 104 via browser 108.

In some embodiments, server 104 may include a public or private host server configured to store a plurality of web pages accessible by a plurality of different clients. In some embodiments, the user interfacing with client 102 may decide that the web page data or file contents accessed from server 104 should be captured and stored for future use, for example, for use as a record, an audit record, objective evidence, a research artifact, or for any other suitable application. The user may utilize client 102 to request or trigger server 104 to capture and store a web page screenshot as a portable document for retrieval at a later date or time. The stored document may resemble the originally displayed web page; however, some content may be optionally suppressed. The captured and stored document may be accessible by a specific client that triggered the capture and storage of the portable document, or multiple different clients (e.g., a group of clients) any one of which may be different from the client that triggered the capture of the portable document.

Client 102 may include any suitable device configured to access data from server 104. Client 102 may include any suitable type of computing device having a processor and memory, for example, a computer (e.g., a desktop or a laptop), a tablet, a netbook, a phone, a personal digital assistant (PDA), a wearable computer, etc. In some embodiments, client 102 includes functionality for triggering server 104 to capture and store a web page screenshot. In some embodiments, client 102 includes a device having a user interface (e.g., a graphical user interface (GUI), a voice activated interface, a touch activated interface, etc.), by which a user triggers the capture and storage of a web page screenshot, for example, by activating a link (e.g., clicking or touching a link), speaking a command, touching a button or screen of a GUI, etc. In some embodiments, when a user is accessing data from a web page, the user may interface with client 102 to instruct server 104 to capture a screenshot of the web page and then store the captured screenshot as a portable document. The portable document including the web page screenshot may be retrieved at another time by either the user that triggered the capture and/or by any other user.

Notably, server 104 is configured to capture a web page screenshot via a screenshot capture module (SCM) 110, and store the web page screenshot as a portable document within a storage element or storage device 112. The term "portable document" refers to any transferable document or file, for example, including but not limited to documents having a ".pdf" file extension. In some embodiments, SCM 110 is integrated with server 104 and includes functionality for generating a screenshot of a web page via copying the web page file contents and generating an intermediate HTML copy of the web page. SCM 110 also includes functionality for converting the intermediate copy of the web page from a HTML format into a PDF and optionally suppressing some of the content from appearing on the captured screenshot. Notably, the PDF screenshot may include the entire contents of the web page, absent any content that may be suppressed, for storage on server 104 thereby obviating the need for the client to scroll down and capture multiple screenshots of one web page. The captured and stored web page screenshot may also be authenticated at server 104 by attaching a date and/or timestamp associated with the stored document. The captured screenshot includes a copy of the web page as it visually appeared to the user interfacing with client 102 on the given date (absent any suppressed content) for later retrieval from server 104 by any user and/or groups of users.

In some embodiments, the portable document generated by SCM 110 and stored in storage device 112 includes a copy of both the static and dynamic content (e.g., text, tables, pictures, links, graphics, photographs, etc.) as it visually appeared on a web page to a user and/or any member of a group of users interfacing with client 102 at the time of capture. The portable document can be captured and stored directly on the server-side (e.g., via server 104) of the Internet 106 connection upon a trigger or request received from client 102. The stored content may then be later retrieved by the user initiate the capture, or by any other user, where desired.

In some embodiments, SCM 110 includes functionality for storing the HTML response content of the dynamic web page prior to it being dispatched to client 102. The HTML content contains the layout, text, tables, photographs, and/or graphical references (e.g., file contents) that the user sees on the web page via interfacing with client 102. The content of interest may be flagged on the dynamic web page using special tag attribute flags. Unwanted content (e.g., links, buttons, private or sensitive information (e.g., account information), private photographs, information designated as private, etc.) may be optionally suppressed to not appear in the final stored document and, therefore, not be stored in screenshot PDF within storage element or storage device 112.

In some embodiments, SCM 110 is optionally configured to embed special tag attribute flags associated with the content of interest so that the tagged information is captured and stored as a portable document. Alternatively, unwanted content may be embedded with the optional special attribute flags so that the unwanted tagged information is not captured and/or stored as part of the portable document. In some embodiments, no content is suppressed, thus, the PDF contains a screenshot that is an exact replica of the web page displayed to client 102 at the time of capture. Notably, the user (e.g., the author, contributor, posting individual, etc.) has the option of whether or not to suppress content at the time of capture.

In some embodiments and upon receiving a trigger, SCM 110 is configured to parse the web page HTML file and generate an intermediate HTML file while processing the special tag attribute flags. Thus, unwanted elements are optionally suppressed and not included in the intermediate HTML file. SCM 110 includes functionality to execute software, in the form of application programming interfaces (APIs), for converting the original web page HTML file into the intermediate HTML file having suppressed content used for generating the portable document (e.g., PDF) of the captured screenshot.

In some embodiments, SCM 110 includes functionality for executing an HTML to PDF conversion API to generate a retrievable PDF document from the intermediate HTML having the optionally suppressed content. In some embodiments, none of the content appearing in the original web page may be suppressed. The final PDF may include a screenshot of the original web page, which may or may not include the tagged content. Notably, dynamic and static content appearing on a web page may be captured and stored on server 104 as a portable document via SCM 110 for use in any number of applications not limited to use as a research artifact, evidence, social media, or any other type of record (e.g., audit or accounting records). A user that is interfacing with client 102 can more efficiently and easily store valuable information appearing on a graphical user interface (GUI) screen (e.g., text and pictures) in a certain layout as it appeared upon viewing a web page, as a portable document for later retrieval from server 104 by any user, and is not limited to retrieval by any particular client. In some embodiments, multiple users belonging to a group may retrieve content. In other embodiment, personal information may be captured and stored via SCM 110, where any private data is suppressed.

Notably, server 104 and SCM 110 each comprise a special purpose computer device or machine that includes hardware components (e.g., one or more processor units, memory, and network interfaces) configured to execute software elements (e.g., applications, APIs, cartridges, modules, etc.) for the purposes of performing one or more aspects of the disclosed subject matter herein. In addition, it should be noted that server 104 and its components and functionality described herein, including SCM 110, constitute a special purpose computer that improves the technological field pertaining to document preservation systems by providing mechanisms for capturing and storing web page content (e.g., dynamic and static content) on the server-side of an Internet 106 connection for later retrieval by either the user that triggered the web page capture or any other user.

It will be appreciated that FIG. 1 is for illustrative purposes only and that various components, their locations, and/or their functions described above in relation to FIG. 1 may be changed, altered, added, or removed. For example, some components and/or functions may be separated or combined into one entity, e.g., SCM 110 or some functionality therein may be segregated from server 104 and/or be integrated with any other entities associated with system 100.

Figure 2:
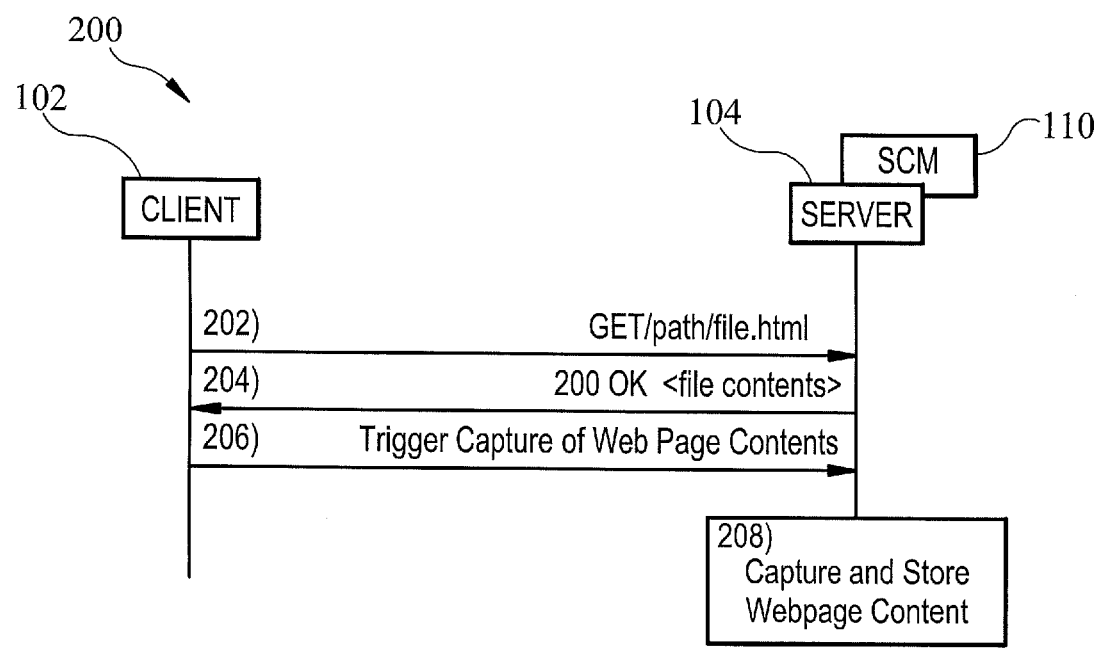
FIG. 2 is a schematic message diagram illustrating exemplary communications for capturing and storing a web page screenshot according to an embodiment of the subject matter described herein.

FIG. 2 is a schematic message diagram 200 illustrating exemplary communications between client 102 and server 104 for capturing and storing a web page screenshot according to an embodiment of the subject matter described herein.

In a first communication 202, client sends a HyperText Transfer Protocol (HTTP) GET message to request data from server 104. The GET message may include a path and a file name associated with a desired web page having desired information and/or content for capture and storage as a portable document. In some embodiments, the GET message optionally includes an address in the form of "path/file.html" for specifying a resource address.

In a second communication 204, server 104 acknowledges client's request for data by communicating a 200 OK message to client 102. Server 104 also transmits the file contents to client 102 in the form of a web page for display to client 102. The web page file contents can be accessed, processed, and displayed to a user interfacing with client 102. The web page file contents may include both static and dynamic information for use in configuring a web page display to a user that is interfacing with client 102. Notably, the entire file contents of the visible display (e.g., as it appears to user at the time of capture) can be captured and saved as a portable document on the server-side when server 104 receives a trigger (request) or indication from client 102.

In a third communication 206, client 102 transmits, sends, or otherwise communicates a trigger to server 104. The trigger includes any type of signal, request, or indication for instructing server 104 to execute and initiate the capture and storage of web page content. Third communication 206 may include a HTTP POST message indicating to server 104 a time at which to capture and store a copy of a web page screenshot displayed on client 102 for later retrieval. Third communication 206 may be invoked or transmitted upon a user clicking, pressing, activating, speaking, or otherwise interfacing with a link, button, or command resource appearing on and/or as a function of a user interface associated with client 102.

In block 208, server 104 captures and stores web page content as a portable document via SCM 110. SCM 110 includes functionality for parsing, copying, and temporarily storing a copy of the HTML file displayed to client 102. SCM 110 is configured to capture the web page file contents via copying the HTML file, processing content suppression tags and/or flags embedded within the processed HTML file for generating an intermediate HTML, and converting the intermediate HTML file into a PDF file. The PDF file can be stored at server 104 and retrieved by any user and/or by multiple users interfacing with multiple different client devices at a later date or time.

It will be appreciated that the exemplary communications illustrated via schematic message diagram 200 between client 102 and server 104 are for illustrative purposes only, and that different and/or additional communications may be used to invoke the capture and storage of a web page screenshot as a PDF and/or for triggering the functionality of SCM 110 residing at server 104 or any other suitable component of system 100 (FIG. 1).

In some embodiments, the captured and stored PDF file includes an optional client identifier (e.g., an International Mobile Subscriber Identifier (IMSI), a Mobile Subscription Identification Number (MSIN), a Media Access Control (MAC) address, Network Access Identifier (NAI), an Internet Protocol (IP) address, a hardware address, a physical address, etc.), a capture identifier (e.g., in the form of a filename.pdf), and/or timestamp (e.g., a date and/or time). Table 1 includes exemplary information that may be optionally stored in storage device 112 to identify the captured web page screenshot portable document file.

TABLE 1

| Client Identifier | Capture Identifier | Timestamp |
|---|---|---|
| IMSI:310150123456789 | filename1.pdf | Sat Jul 23 02:16:57 2015 |
| MSIN:123456789 | filename2.pdf | 2015-10-30 T 10:45 UTC |

Table 1 includes exemplary data that may be generated and stored to associate a captured web page screenshot with a given client and/or file name for later retrieval. It will be appreciated that any other suitable information may be associated with the captured and converted PDF screenshot for use in a later retrieval.

As noted above, the captured and stored PDF file can be stored at server 104 and retrieved by multiple clients or users (e.g., one or more groups of clients or users) interfacing with multiple different client devices at any given date or time. In some embodiments, the captured and stored PDF file may also be associated with an optional group identifier (e.g., a numeric value identifying a group, a group having a password or login requirement, a common group identifier associated with clients having privileges or permissions to access stored document(s), etc.)

As Table 2 indicates below, a Group Identifier (GID) may optionally be associated with multiple client (user) identifiers for use in retrieving a captured and stored document having a portable format. Thus, server 104 may be configured to convert and store at least one PDF screenshot for later retrieval by multiple, different users, which can optionally be grouped, correlated, and/or identified via a common group identifier.

TABLE 2

| Group Identifier | Client Identifier |
|---|---|
| Group 1 | IMSI-1; IMSI-2; MAC-1; MSIN-1 |
| Group 2 | IP address-A; IP address-B; MSIN-A; IMSI-B |
| Group X | IMSI-X; IMSI-Y; IP address-X |

Table 2 includes exemplary information that may be optionally stored in storage device 112 to identify one or more groups of users that are authorized and/or permitted to retrieve the captured web page screenshot portable document file. As Table 2 indicates above, multiple client identifiers (e.g., IMSI-1, IMSI-2, MAC-1, etc.) that are associated with and/or identify multiple different clients may be associated with a first group (e.g., "Group 1"). Similarly, multiple client identifiers that identify multiple clients may also be associated with Group 2 to Group X (where X is a whole integer >2). In some embodiments, documents captured and stored in a portable format are accessible by any member of a given group as identified by Table 2.

In some embodiments, triggering the capture and storage of HTML content in a portable format may be triggered by any one member of the identified group. That is, any member of Group 1 (e.g., IMSI-1, IMSI-2, MAC-1, etc.) could trigger the capture and storage of a screenshot for later retrieval. Any member of the group could then retrieve the captured and stored screenshot having the portable format (e.g., a PDF). The group may have special permissions, privileges, login information, passwords, accounts, etc. by which the users are identified or grouped via a common identifier (e.g., a GID). In some embodiments, multiple client identifiers (e.g., multiple IMSIs, multiple MSINs, multiple MAC addresses, etc.) may be associated with a single, common group identifier (e.g., generically deemed "Group 1" to "Group X" above) thereby allowing several clients to access to captured and stored data.

Table 2 includes exemplary information that may be optionally stored in storage device 112 to identify clients or users that are allowed to access captured information. It will be appreciated that Table 2 includes exemplary information for illustrative purposes only, and that different and/or additional information may be used to invoke the retrieval of captured and stored information.

Table 3 includes further exemplary information that may be optionally stored in storage device 112 to identify one or more files that are authorized for retrieval by one or more clients within a group.

TABLE 3

| Group Identifier | Capture Identifier |
|---|---|
| Group 1 | Screenshot_1.pdf |
| Group 1 | Screenshot_2.pdf |
| Group 1 | Screenshot_3.pdf |
| Group 2 | Screenshot_X.pdf |
| Group 2 | Screenshot_Y.pdf |
| Group 2 | Screenshot_Z.pdf |
| Group X | Screenshot_A.pdf |
| Group X | Screenshot_B.pdf |

In some embodiments and as Table 3 indicates above, a group of clients may be associated with one or more stored documents. Each stored document may be identified via a capture identifier such as a file name or number. Thus, each member of a group, for example, members of Group 1, Group 2, Group X (e.g., where X is a whole number integer >2) may have access, permission, and/or privileges to obtain the HTML content that is stored in a portable format (e.g., PDF). For example, any member of Group 1 could access and retrieve one or more captured and stored screenshots. In some embodiments, members (clients) of a group may have special permissions, privileges, login information, passwords, accounts, etc., for accessing captured content.

It will be appreciated that Table 3 includes exemplary information for illustrative purposes only, and that different and/or additional information may be used to retrieve the captured and stored documents.

Figure 3:
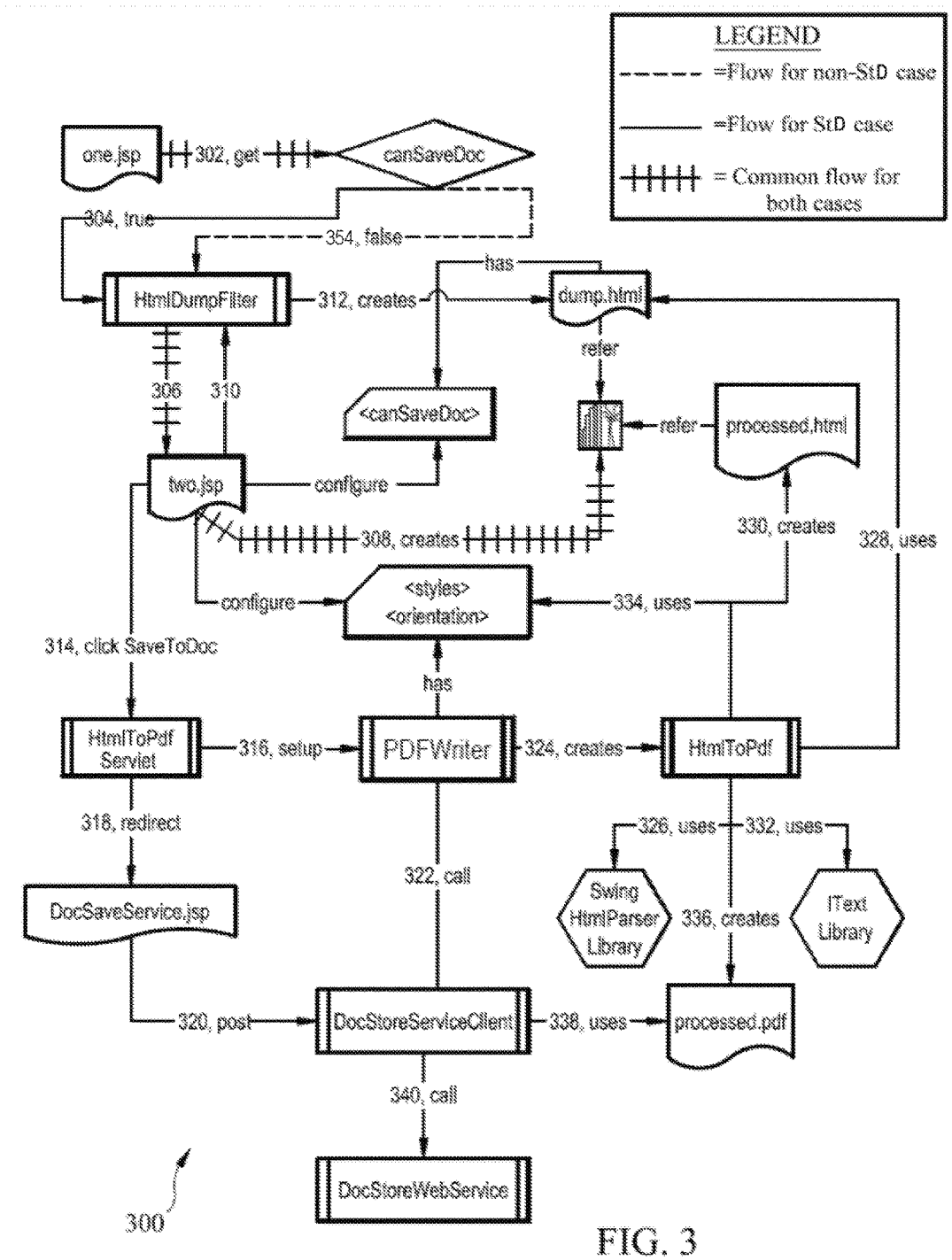
FIG. 3 is a schematic block diagram illustrating an exemplary process flow associated with capturing and storing a web page screenshot according to an embodiment of the subject matter described herein.

FIG. 3 is a schematic block diagram illustrating an exemplary workflow 300 associated with capturing and storing a web page screenshot via functionality provided by SCM 110 according to an embodiment of the subject matter described herein. FIG. 3 illustrates the process flow for performing what is designated a "Save to Document" or (StD) workflow, a non-StD workflow, and/or a common workflow as indicated by the Legend appearing in FIG. 3. The phrase "Save to Document" refers to the process of capturing a web page screenshot and/or content or artifacts thereof for future use, and storing the screenshot as a portable document on a server. The document may be stored in a document store or repository. In FIG. 3, exemplary workflow 300 is performed using the JAVA programming language to capture a screenshot of a web page and convert it to a PDF. The web page is viewable to a user on a client-side of an Internet connection, and is preserved as a PDF and stored on the server-side of the Internet connection for later retrieval. To initiate capture and storage of a screenshot as a PDF, a user may click or otherwise activate a StD link appearing on an interface (e.g., a GUI) associated with a respective client device, thereby triggering the host server to execute the StD workflow of FIG. 3 via SCM 110 (FIG. 1).

In some embodiments, FIG. 3 further illustrates performing the StD workflow, including the optional content suppression, via functionality provided by SCM 110 (FIG. 1). That is, SCM 110 may include the functionality for performing the workflow 300 identified in FIG. 3. One technology or method of generating a web page and/or web page content based on HTML is using JavaServer Pages (JSP). That is, JSP is but one exemplary technology by which dynamically generated web pages based on HTML, XML, or other document types are created, and may have a ".jsp" file extension. It will be appreciated that any other technology may be employed for generating workflows in addition to and/or in place of JSP.

In some embodiments, JSP tags or flags may be used to embed or tag the files or file content to capture so that it is distinguished from content to suppress. Tagged content may appear in the final PDF screenshot of the web page. Alternatively, the tagged content may not appear in the final PDF screenshot (e.g., and be suppressed), depending on how the embedded tags are processed.

Referring to FIG. 3 and in a first process flow step 302, the file "one.jsp" has a link to the file "two.jsp" with an option to specify a "canSaveDoc" parameter as being "true" or "false". Where the "canSaveDoc" parameter is set to true, the file two.jsp will be designated as a page having a StD link thereon. The StD link may be activated via clicking a link (or any other suitable method) of a GUI associated with a client device (e.g., 102, FIG. 1). Activating the StD link thus enables the content appearing on the file two.jsp to be captured, converted to a PDF, and stored as a screenshot via sending such artifacts to a repository or store service.

In process flow steps 304 and 354, it is determined whether the "canSaveDoc" parameter is set to true or false (null). The process flow ends in process flow step 354 if the "canSaveDoc" parameter is set to false (null). Where the "canSaveDoc" parameter or attribute is set to true in process flow step 304, then an HtmlDumpFilter is configured to intercept the call or communication link to the file two.jsp in process flow step 306 before calling the jsp. This can set up context for writing the response to a byte array stream.

In process flow step 308, the file two.jsp creates one or more image artifacts (if any are present). In some embodiments, the file two.jsp includes container tags such as <div> and <table> with an option to specify or configure the "canSaveDoc" attribute (parameter) as true. The "canSaveDoc" attribute associated with content signifies which elements or content (e.g., and any nested elements or content) will eventually make it into the processed.html that a user sees upon interfacing with a client device communicating with the server that is processing and hosting two.jsp. In parallel with process flow step 308 and for StD cases, PDF document properties such as <styles> and <orientation> can be specified and made available to a writer and a display specification available in the session.

In process flow step 310, HtmlDumpFilter regains the control for response to the GET message received in first process flow step 302. HtmlDumpFilter is configured to write the response to a servlet output stream. In process flow step 312, HtmlDumpFilter also writes a response byte array to a dump.html file that has references to any images.

In process flow step 314, a user interfacing with a client device that is getting data from a server clicks on a SaveToDoc link appearing on the web page to initiate a desired screenshot capture. Clicking the SaveToDoc link in process flow step 314 invokes an HtmlToPdfServlet. In process flow step 316, the HtmlToPdfServlet sets up a PDFWriter and a display specification available in the session. In process flow step 318, the HtmlToPdfServlet redirects to a jsp that shows up as a pop-up for a user to specify a repository, storage, or store to which artifacts should be attached.

In process flow step 320, when a user clicks submit, the HTTP POST message is handled by a DocumentStore class. In process flow step 322, the DocumentStore calls a writer class or PDFWriter in order to generate the PDF. In process flow step 324, the PDFWriter utilizes an HtmlToPdf utility class to generate a PDF from HTML.

In process flow steps 326 to 330, the HtmlToPdf utility class utilizes a Swing HtmlParser Library to select APIs for creating the processed.html from the dump.html (e.g., the intermediate html as previously described). The processed.html contains the container and nested elements with canSaveDoc equal to true.

In process flow steps 332 to 336, the HtmlToPdf utility class utilizes an iText Library of pdf APIs to generate a processed.pdf using the processed.html styles and orientation available in the PDFWriter.

In process flow steps 338 and 340, the DocStoreService-Client invokes the DocStoreWebService and sends the generated processed.pdf to a storage device that maintains the PDF until it is retrieved at a later date or time.

It will be appreciated that the exemplary workflow illustrated via FIG. 3 is for illustrative purposes only and that different and/or additional workflows may be used to invoke the capture and storage of a web page screenshot as a PDF and/or for triggering the functionality of SCM 110 (FIG. 1) to perform actions and/or invoke the workflows and functionality illustrated by FIG. 3.

Figure 4:
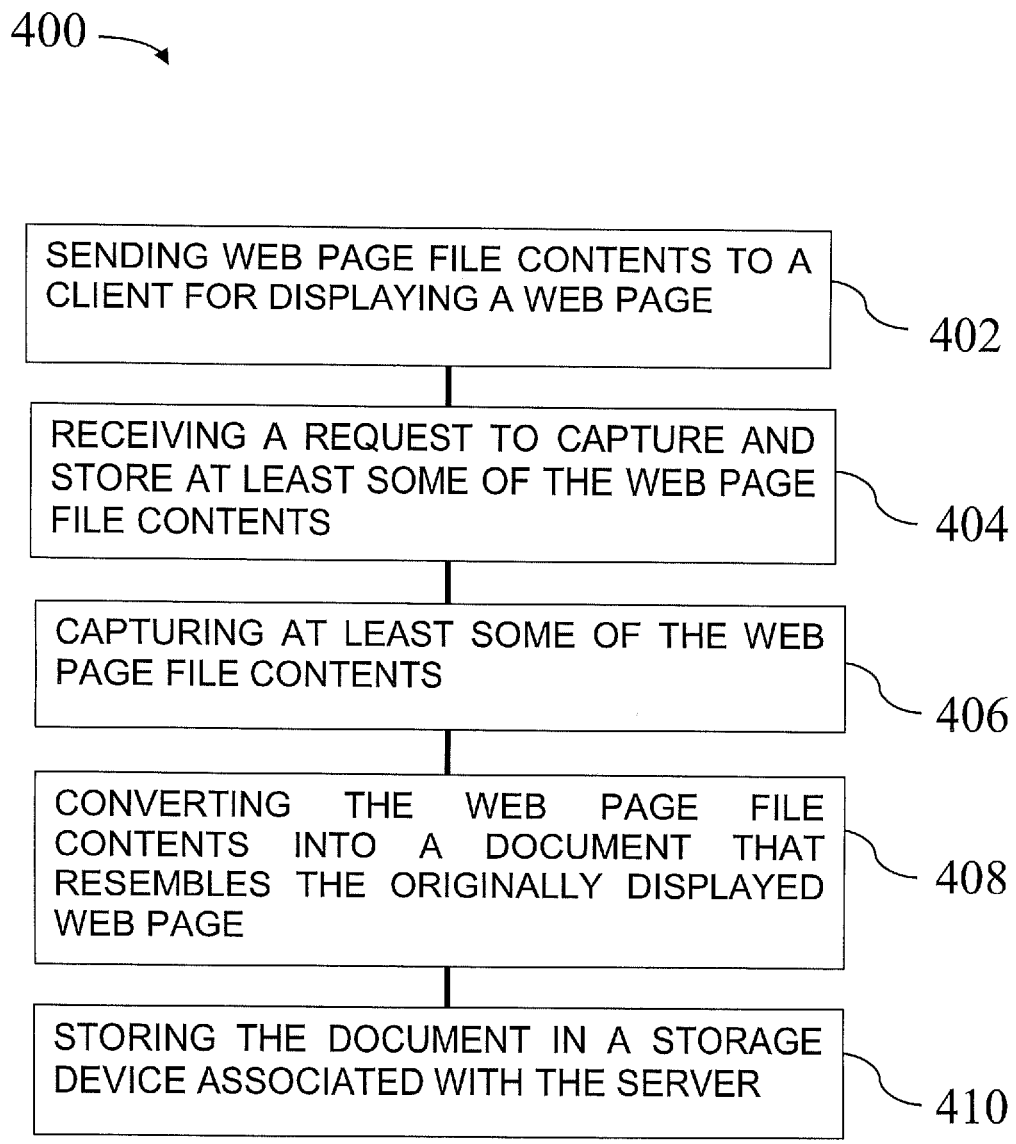
FIG. 4 is a schematic block diagram illustrating an exemplary process for capturing and storing a web page screenshot according to an embodiment of the subject matter described herein.

FIG. 4 is a schematic block diagram illustrating an exemplary process for capturing and storing a web page screenshot at a server according to an embodiment of the subject matter described herein. In block 402, web page file contents are sent to a client for downloading and displaying a web page. In block 404, a request to capture and store at least some of the web page file contents is received and processed at the server.

In block 406, at least some of the web page file contents are captured at the server. In some embodiments, this capture includes copying the HTML file contents of the displayed web page prior to sending the HTML file contents to a client and generating an intermediate HTML file that will be converted into a document. The document may have a portable format (e.g., a PDF having a ".pdf" file extension).

In block 408, at least some of the web page file contents are converted into a document that resembles the displayed web page. In block 410, the document is stored in a storage device associated with the server. In some embodiments, the storage device resides at the server. The document may be captured and stored upon receiving a trigger or any other suitable indication from a client directing the server to capture and store webpage content as a document having a portable format. The captured and stored screenshots may be identified in storage using a capture identifier (e.g., a file name or number) and/or associated with a client identifier and/or a group identifier for retrieval by one or more clients. Notably, the stored information may be retrieved by one or more clients that may not have initiated the trigger the capture and storage of the screenshot.

It will also be appreciated that the exemplary process 400 of FIG. 4 is for illustrative purposes and that different and/or additional actions may be used. It will also be appreciated that various actions associated with exemplary process 400 may occur in a different order or sequence.

It will be appreciated that server 104 (FIG. 1), SCM 110 (FIG. 1) and/or functionality described herein may constitute a special purpose computer. Further, it will be appreciated that server 104 (FIG. 1), SCM 110 (FIG. 1) and/or functionality described herein can improve the technological field pertaining to document management, authentication, and/or retrieval for supporting workflows between HTML and PDF conversion and storage of PDF documents on a server by for retrieval by any client, and not just the original client that viewed the web page.

It will be understood that various details of the subject matter described herein may be changed without departing from the scope of the subject matter described herein.

Furthermore, the foregoing description is for the purpose of illustration only, and not for the purpose of limitation, as the subject matter described herein is defined by the claims as set forth hereinafter.

What is claimed is:

1. A method for capturing and storing a web page screenshot, the method comprising:
at a server:
receiving a request for a web page from a client;
determining, based on a first server-hosted file, that the web page includes a parameter value specifying to enable the web page to be saved as a web page screenshot;
in response to receiving the request and determining that the web page includes the parameter value specifying to enable the web page to be saved as a web page screenshot, calling a second server-hosted file to generate web page file contents and sending the web page file contents to the client for displaying the web page, wherein the web page file contents are one or more HyperText Markup Language (HTML) files, wherein the second server-hosted file includes one or more parameters that identify content from the web page file contents to be displayed on the web page that can be optionally retained;
receiving a request to capture and store a web page screenshot, captured by the server, of the web page as displayed at the client at a time of capture;
parsing the second server-hosted file and identifying content from the web page file contents based on the one or more parameters to place the identified content for retention in an intermediate HyperText Markup Language (HTML) file from the web page file contents;
converting the intermediate HTML file into the web page screenshot of the web page as displayed at the client at the time of capture as a document that when displayed shows the web page as displayed at the client with only the content identified by the one or more parameters for retention; and
storing the document in a storage device associated with the server.

2. The method of claim 1, wherein the document comprises a Portable Document Format (PDF).

3. The method of claim 1, wherein the document is retrievable from the server by any one of a plurality of different clients.

4. The method of claim 1, wherein the document is retrievable from the server by a group of clients having a common group identifier.

5. The method of claim 1, wherein receiving a request to capture and store at least some of the web page file contents comprises receiving a trigger in the form of a HyperText Transfer Protocol (HTTP) post message to initiate capturing of at least some of the web page file contents.

6. The method of claim 1, further comprising converting the intermediate HTML file into a Portable Document Format (PDF).

7. The method of claim 1, wherein at least some of the web page file contents are dynamically created JavaServer Pages (JSP) files.

8. The method of claim 7, further comprising associating a link with the JSP files, wherein the link enables the JSP files to be captured and stored as the document.

9. A system for capturing and storing web page content as a screenshot, the system comprising:
a server configured to:
receive a request for a web page from a client;
determine, based on a first server-hosted file, that the web page includes a parameter value specifying to enable the web page to be saved as a web page screenshot;
in response to receiving the request and determining that the web page includes the parameter value specifying to enable the web page to be saved as a web page screenshot, call a second server-hosted file to generate web page file contents and send the web page file contents to the client, wherein the web page file contents are one or more HyperText Markup Language (HTML) files, wherein the second server-hosted file includes one or more parameters that identify content from the web page file contents to be displayed on the web page that can be optionally retained;
receive a request to capture and store a web page screenshot, captured by the server, of the web page as displayed at the client at a time of capture,
parse the second server-hosted file and identifying content from the web page file contents based on the one or more parameters to place the identified content for retention in an intermediate HyperText Markup Language (HTML) file from the web page file contents, and
convert the intermediate HTML file into the web page screenshot of the web page as displayed at the client at the time of capture as a document in a portable format that when displayed shows the web page as displayed at the client with only the content identified by the one or more parameters for retention; and
a storage device associated with the server for storing the document in the portable format for later retrieval.

10. The system of claim 9, wherein the portable format comprises a Portable Document Format (PDF).

11. The system of claim 9, wherein the stored portable format is retrievable from the server by any one of a plurality of different clients.

12. The system of claim 9, wherein the document is retrievable from the server by a group of clients having a common group identifier.

13. The system of claim 9, wherein the server receives a trigger in the form of a HyperText Transfer Protocol (HTTP) post message signifying a time at which the server is to capture and store at least some of the web page file contents.

14. The system of claim 9, wherein at least some of the web page file contents are dynamically created JavaServer Pages (JSP) files.

15. The system of claim 14, wherein a link is associated with the JSP files for enabling the JSP files to be captured and stored as a PDF.

16. A non-transitory computer readable medium having stored thereon executable instructions that when executed by a processor of a computer cause the computer to perform steps comprising:
receiving a request for a web page from a client;
determining, based on a first server-hosted file, that the web page includes a parameter value specifying to enable the web page to be saved as a web page screenshot;
in response to receiving the request and determining that the web page includes the parameter value specifying to enable the web page to be saved as a web page screenshot, calling a second server-hosted file to generate web page file contents and sending the web page file contents to the client for displaying the web page, wherein the web page file contents are one or more HyperText Markup Language (HTML) files, wherein the second server-hosted file includes one or more parameters that identify content from the web page file contents to be displayed on the web page that can be optionally retained;

receiving a request to capture and store a web page screenshot, captured by the server, of the web page as displayed at the client at a time of capture;

parsing the second server-hosted file and identifying content from the web page file contents based on the one or more parameters to place the identified content for retention in an intermediate HyperText Markup Language (HTML) file from the web page file contents;

converting the intermediate HTML file into the web page screenshot of the web page as displayed at the client at the time of capture as a document that when displayed shows the web page as displayed at the client with only the content identified by the one or more parameters for retention; and storing the document in a storage device.

\* \* \* \* \*

UNITED STATES PATENT AND TRADEMARK OFFICE
CERTIFICATE OF CORRECTION

| | | |
|---|---|---|
| PATENT NO. | : 10,339,199 B2 | Page 1 of 1 |
| APPLICATION NO. | : 14/683802 | |
| DATED | : July 2, 2019 | |
| INVENTOR(S) | : Pancharathi | |

It is certified that error appears in the above-identified patent and that said Letters Patent is hereby corrected as shown below:

In the Specification

In Column 9, Line 24, delete "HtmIDumpFilter" and insert -- HtmlDumpFilter --, therefor.

Signed and Sealed this
Twenty-eighth Day of July, 2020

Andrei Iancu
*Director of the United States Patent and Trademark Office*